(12) United States Patent
Trichter et al.

(10) Patent No.: US 12,362,265 B2
(45) Date of Patent: Jul. 15, 2025

(54) INTEGRATED CIRCUIT (IC) AND ELECTRONIC APPARATUS

(71) Applicant: Nuvoton Technology Corporation, Hsinchu (TW)

(72) Inventors: Uri Trichter, Hsinchu (TW); Tsung-Hsueh Li, Yunlin County (TW); Dan Morav, Hsinchu (TW); Benny Shatit, Hsinchu (TW); Lior Albaz, Or Yehuda (IL); Ming-Che Hung, Hsinchu County (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 522 days.

(21) Appl. No.: 17/888,739

(22) Filed: Aug. 16, 2022

(65) Prior Publication Data

US 2023/0075399 A1    Mar. 9, 2023

Related U.S. Application Data

(60) Provisional application No. 63/241,723, filed on Sep. 8, 2021.

(51) Int. Cl.
*H01L 23/495* (2006.01)
*G06F 1/14* (2006.01)
(Continued)

(52) U.S. Cl.
CPC .......... *H01L 23/49513* (2013.01); *G06F 1/14* (2013.01); *G06F 1/30* (2013.01);
(Continued)

(58) Field of Classification Search
CPC ....................................................... H01L 23/57
See application file for complete search history.

(56) References Cited

U.S. PATENT DOCUMENTS

| 10,651,135 B2 * | 5/2020 | Graf ................... G01R 31/2853 |
| 2015/0115317 A1 | 4/2015 | Salcedo et al. |

(Continued)

FOREIGN PATENT DOCUMENTS

| CN | 1479357 A | 3/2004 |
| TW | 201809706 A | 3/2018 |
| TW | 202046109 A | 12/2020 |

OTHER PUBLICATIONS

Office Action issued on Jun. 5, 2023, for the corresponding application No. 111134077 in Taiwan.

*Primary Examiner* — Yu-Hsi D Sun
(74) *Attorney, Agent, or Firm* — Muncy, Geissler, Olds & Lowe, P.C.

(57) ABSTRACT

An integrated circuit (IC) is provided. The IC includes a molding compound, a plurality of pins, an exposed pad, a die surrounded by the molding compound, an adhesive material, and a plurality of bonding wires. The pins are disposed on at least one edge of the molding compound and separated from each other. The adhesive material is disposed between the die and the exposed pad and surrounded by the molding compound. The exposed pad is electrically connected to the die through one of the bonding wires, and the pins are electrically connected to the die through the remaining bonding wires. The die is configured to detect whether a chassis intrusion event is present in response to a signal from the exposed pad.

20 Claims, 3 Drawing Sheets

(51) Int. Cl.
  *G06F 1/30*    (2006.01)
  *G06F 21/55*   (2013.01)
  *G06F 21/87*   (2013.01)
  *H01L 23/00*   (2006.01)
  *H01L 23/31*   (2006.01)
  *H03K 3/84*    (2006.01)

(52) U.S. Cl.
  CPC ............ *G06F 21/554* (2013.01); *G06F 21/87* (2013.01); *H01L 23/3107* (2013.01); *H01L 24/29* (2013.01); *H01L 24/32* (2013.01); *H01L 24/48* (2013.01); *H01L 24/73* (2013.01); *H03K 3/84* (2013.01); *G06F 2221/034* (2013.01); *H01L 24/45* (2013.01); *H01L 2224/2919* (2013.01); *H01L 2224/32245* (2013.01); *H01L 2224/45144* (2013.01); *H01L 2224/48091* (2013.01); *H01L 2224/48247* (2013.01); *H01L 2224/48463* (2013.01); *H01L 2224/73265* (2013.01); *H01L 2924/0665* (2013.01)

(56) References Cited

U.S. PATENT DOCUMENTS

2021/0349044 A1* 11/2021 Fuka .................. G06Q 20/22
2022/0329450 A1* 10/2022 Servat ................ G06F 13/4221

* cited by examiner

INTEGRATED CIRCUIT (IC) AND ELECTRONIC APPARATUS

CROSS REFERENCE TO RELATED APPLICATIONS

This Application claims priority of U.S. Provisional Application No. 63/241,723, filed on Sep. 8, 2021, the entirety of which is incorporated by reference herein.

BACKGROUND OF THE INVENTION

Field of the Invention

The invention relates to an integrated circuit (IC), and more particularly to a real time clock (RTC) IC.

Description of the Related Art

In recent years, various electronic apparatus may embed a real time clock (RTC) in association with functions such as, e.g., sensor sampling and management, metering, Internet of Things (IoT), and so on.

The RTC is capable of outputting the actual time like a clock. Generally, an RTC can used in an electronic apparatus or a system that needs accurate time, such as a personal computer, a server, a storage system, or an embedded system. When an electronic apparatus is powered on, the processor of the electronic apparatus may read the time from the RTC and use that as the system time in the electronic apparatus. However, an intruder can easily modify the system time of the electronic apparatus by modifying the time of the RTC, so as to sidestep the term of the protection of data, which puts the security of the data in the electronic apparatus at risk. Therefore, it is importation to detect the intrusion event.

BRIEF SUMMARY OF THE INVENTION

An integrated circuit (IC) and an electronic apparatus are provided. An embodiment of an IC is provided. The IC includes a molding compound, a plurality of pins, an exposed pad, a die surrounded by the molding compound, an adhesive material, and a plurality of bonding wires. The pins are disposed on at least one edge of the molding compound and separated from each other. The adhesive material is disposed between the die and the exposed pad and surrounded by the molding compound. The exposed pad is electrically connected to the die through one of the bonding wires, and the pins are electrically connected to the die through the remaining bonding wires. The die is configured to detect whether a chassis intrusion event is present in response to a signal from the exposed pad.

Moreover, an embodiment of an electronic apparatus is provided. The electronic apparatus includes a chassis, a chassis open detection switch, a host device, and an integrated circuit (IC). The chassis open detection switch is disposed to contact the chassis. The IC includes a molding compound, a plurality of pins, an exposed pad, a die surrounded by the molding compound, an adhesive material and a plurality of bonding wires. The pins are disposed on at least one edge of the molding compound and separated from each other. A first group of pins is coupled to the host device through a first bus. The exposed pad is electrically connected to the chassis open detection switch to receive the detection signal of the chassis open detection switch. The adhesive material is disposed between the die and the exposed pad. The exposed pad is electrically connected to the die through one of the bonding wires, and the pins are electrically connected to the die through the remaining bonding wires. The IC is configured to detect whether the chassis has been opened in response to the detection signal from the exposed pad.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Some variations of the embodiments are described. Throughout the various views and illustrative embodiments, like reference numbers are used to designate like elements. Furthermore, spatially relative terms, such as "beneath," "below," "lower," "above," "upper" and the like, may be used herein for ease of description to describe one element or feature's relationship to another element(s) or feature(s) as illustrated in the figures.

Figure 1B:
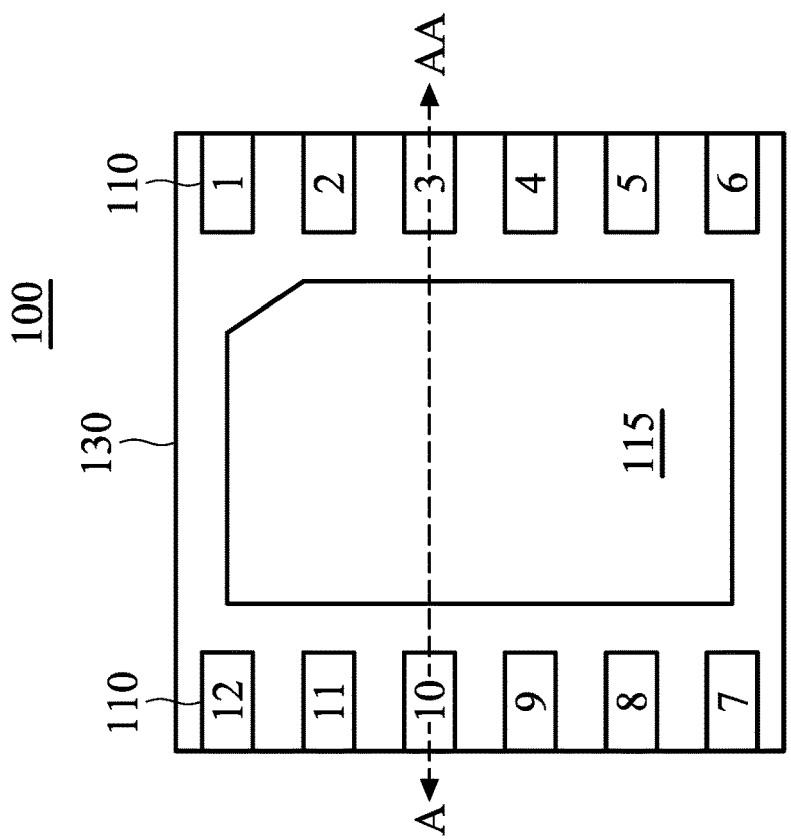
FIG. 1B shows a bottom view of the IC according to some embodiments of the invention.
Figure 1A:
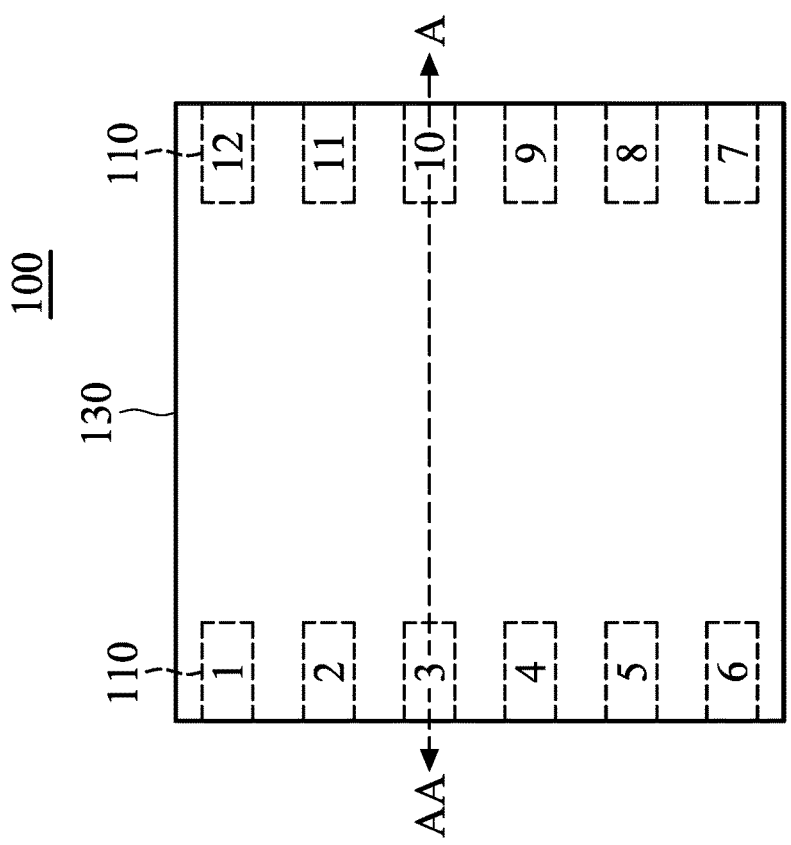
FIG. 1A shows a top view of an integrated circuit (IC) according to some embodiments of the invention.

FIG. 1A shows a top view of an integrated circuit (IC) 100 according to some embodiments of the invention, and FIG. 1B shows a bottom view of the IC 100 according to some embodiments of the invention. The IC 100 is a quad flat no-lead (QFN)-packaged device with 12 pins (or leads, contact terminals) 110. In some embodiments, the IC 100 may be other type packaged device, such as quad flat package (QFP), ball grid array (BGA) and so on. It should be noted that the pin number of the IC 100 is only an example, and is not intended to limit the invention. The IC 100 can include more or less pins 110.

The IC 100 includes the molding compound 130 formed on the top, bottom and sides of the IC 100. The pins 110 are formed by the conductive material, e.g., metal material, and the pins 110 are disposed on bottom surface of the IC 100. Furthermore, the pins 110 are disposed while being spaced apart from each other at the edges of the molding compound 130. The IC 100 further includes an exposed pad 115 disposed on the bottom surface of the IC 100.

The exposed pad 115 is disposed between the pins 110. In other words, the exposed pad 115 is surrounded by the pins 110. Furthermore, the exposed pad 115 has larger area than the pin 110. For example, the dimension of the exposed pad 115 is greater than that of the pin 110 in the X direction and in the Y direction. In the IC 100, the exposed pad 115 functions as a signal pad, and not a ground pad or a thermal pad. It should be noted that the shape and size of the exposed pad 115 is only an example, and is not intended to limit the invention.

Figure 1C:
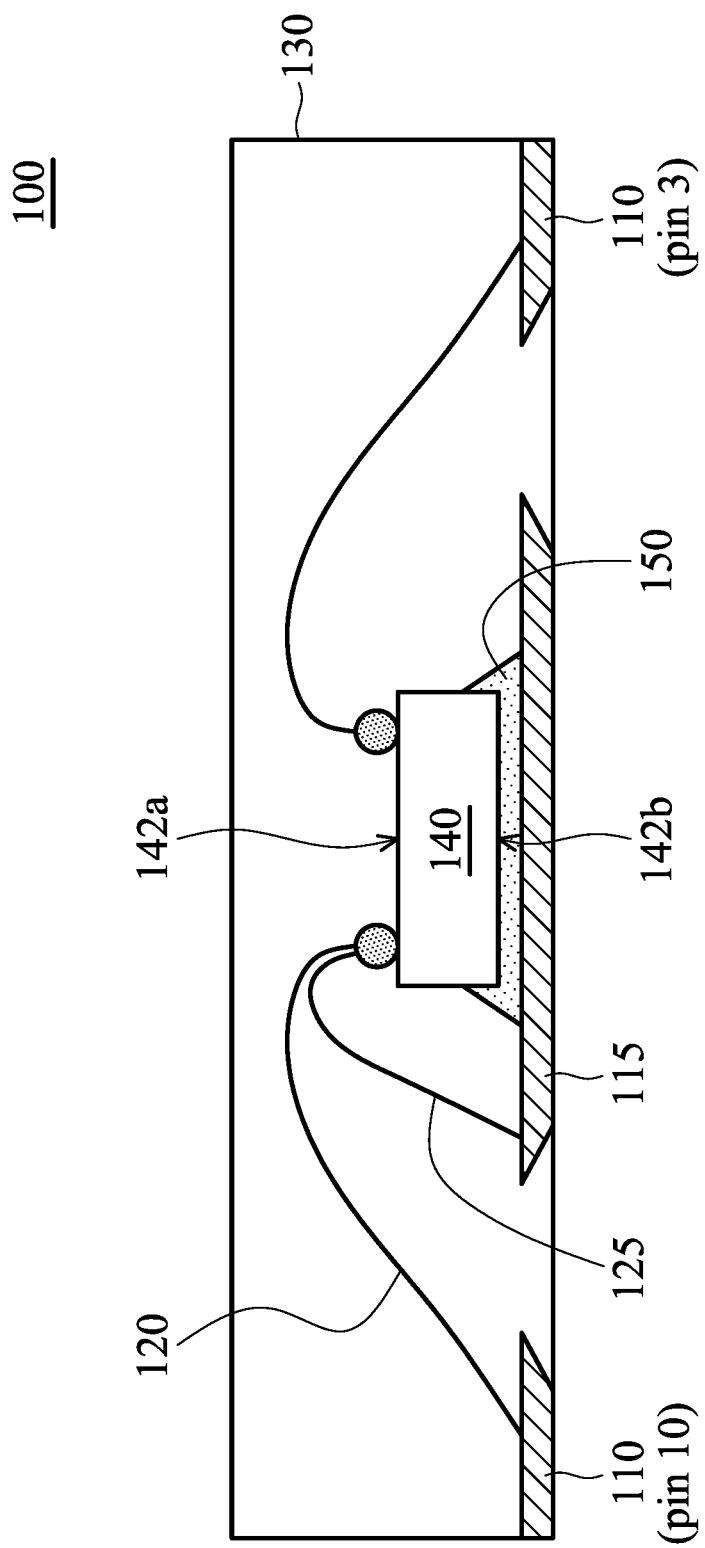
FIG. 1C shows a cross sectional view of the IC along a line A-AA in FIGS. 1A and 1B according to some embodiments of the invention.

FIG. 1C shows a cross sectional view of the IC 100 along a line A-AA in FIGS. 1A and 1B according to some embodiments of the invention. The IC 100 includes the pins 110, the exposed pad 115, a plurality of bonding wires 120, a bonding wire 125, the molding compound 130, a die 140 and an adhesive material 150. The pins 110 and the exposed pad 115 are separated from each other by the molding compound 130.

The adhesive material 150 is formed over the exposed pad 115 and surrounded by the molding compound 130. The adhesive material 150 is configured to fix the die 140. In other words, the adhesive material 150 is disposed between the lower surface 142b of the die 140 and the exposed pad 115. The adhesive material 150 is the non-conductive material, e.g., the non-conductive epoxy. The die 140 is surrounded by the molding compound 130. Furthermore, the upper surface 142a of the die 140 is in contact with the molding compound 130, and the lower surface 142b of the die 140 is separated from the molding compound 130 by the adhesive material 150.

The pins 110 are electrically connected to the pads (not shown) on the upper surface 142a of the die 140 through the corresponding bonding wires 120. Furthermore, the exposed pad 115 is electrically connected to a specific pad (not shown) on the upper surface 142a of the die 140 through the bonding wire 125. In some embodiments, the bonding wire 125 is shorter than the bonding wires 120 because the distance between the die 140 and the exposed pad 115 is closer to the distances between the die 140 and the pins 110. Moreover, the bonding wires 120 and the bonding wire 125 are separated from each other by the molding compound 130. In some embodiments, the bonding wires 120 and the bonding wire 125 are formed by the same conductive material, e.g., gold (Au).

Figure 2:
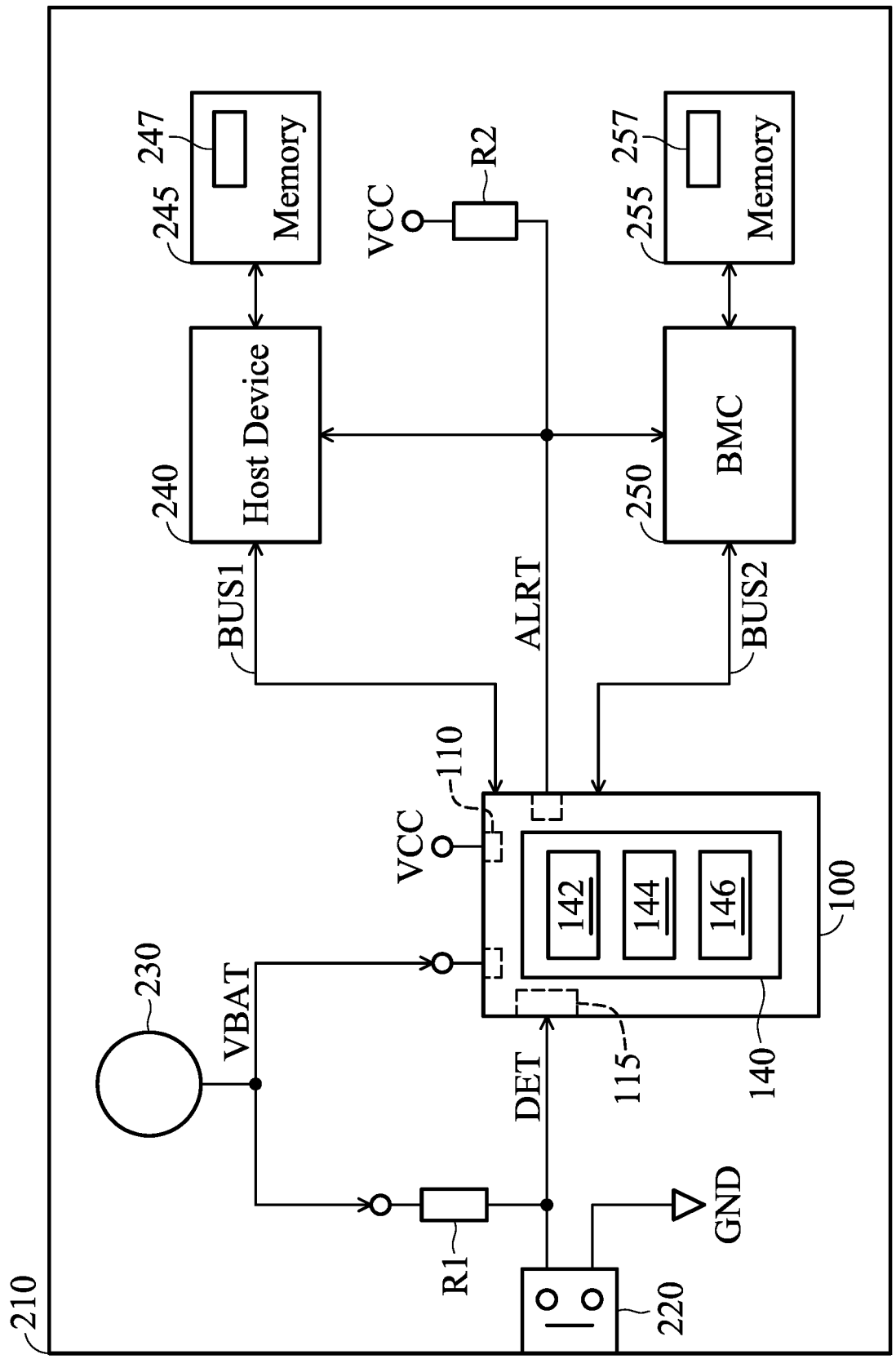
FIG. 2 shows a schematic illustrating an electronic apparatus 200 according to some embodiments of the invention.

FIG. 2 shows a schematic illustrating an electronic apparatus 200 according to some embodiments of the invention. The electronic apparatus 200 has a chassis 210. The electronic apparatus 200 includes a chassis open detection switch 220, an IC 100, a coin battery 230, a host device (or a host processor) 240, a baseboard management controller (BMC) 250, the memories 245 and 255 and the resistors R1 and R2. In some embodiments, the chassis open detection switch 220, the IC 100, the coin battery 230, the host device 240, the BMC 250, the memories 245 and 255 and the resistors R1 and R2 are disposed in one or more printed circuit boards (PCBs) inside the chassis 210.

It should be noted that, in order to clarify the concept of the invention, FIG. 2 is a simplified block diagram in which only the elements relevant to the invention are shown. However, the invention should not be limited to what is shown in FIG. 2.

The coin battery 230 is configured to provide a fixed voltage VBAT as a power supply for the IC 100. The resistor R1 is a pull-up resistor. The resistor R1 has a first terminal coupled to the coin battery 230 and a second terminal coupled to the chassis open detection switch 220 and the exposed pad 115 of the IC 100. As described above, the exposed pad 115 has greater dimension than the pins 110 of the IC 100.

The chassis open detection switch 220 is disposed to contact the chassis 210. The chassis open detection switch 220 is coupled between the resistor R1 and a ground GND. When the chassis 210 is not opened, the chassis open detection switch 220 is turned off, and a detection signal DET of the chassis open detection switch 220 is pulled to a high voltage level corresponding to the voltage VBAT through the resistor R1. Conversely, when the chassis 210 is opened, the chassis open detection switch 220 is turned on, and the detection signal DET is pulled to a low voltage level corresponding to the ground GND through the chassis open detection switch 220. In other words, when the chassis 210 is opened, the detection signal DET has the low voltage level, which indicates a chassis intrusion event in the electronic apparatus 200.

The IC 100 is powered by the voltage VBAT or a power supply VCC received by the pins 110. The power supply VCC is provided by a power generator (not shown) of the electronic apparatus 200 when the electronic apparatus 200 is powered on. Therefore, when the electronic apparatus 200 is powered on, the IC 100 is powered by the power supply VCC. Conversely, when the electronic apparatus 200 is powered off, the IC 100 is powered by the voltage VBAT.

In FIG. 2, the IC 100 is configured to communicate with the host device 240 through a first bus BUS1 and with the BMC 250 through a second bus BUS2. In some embodiments, the IC 100 is configured to communicate with the host device 240 through the second bus BUS2 and with the BMC 250 through the first bus BUS1. The first bus BUS1 and the second bus BUS2 are inter-integrated circuit (I2C) buses. Moreover, the first bus BUS1 and the second bus BUS2 are coupled to the corresponding pins 110 of the IC 100. Each of the first bus BUS1 and the second bus BUS2 has a serial data (SDA) line and a serial clock (SCL) line, and both the SDA and SCL lines are bidirectional lines. Therefore, the first bus BUS1 is coupled to a first group of pins 110 of the IC 100, and the second bus BUS2 is coupled to a second group of pins 110 of the IC 100. The memory 245 and the memory 255 are dedicated memories of the host device 240 and the BMC 250, respectively. In some embodiments, the memory 245 and the memory 255 are non-volatile memories, e.g., flash memories.

In the IC 100, the die 140 includes a real time clock (RTC) circuit 142, a read-only register (or a read-only storage device) 144 and a storage device 146. The RTC circuit 142 is configured to provide the time and date based on the clock signal from the oscillator (not shown). Furthermore, during manufacturing, or after production (when the chassis 210 is closed), the host device 240 or the BMC 250 is configured to program the system time and date into the RTC circuit 142.

When the chassis open detection switch 220 is turned on, the detection signal DET is pulled to a low voltage level. When the die 140 detects that there has been a chassis intrusion event (i.e., the chassis intrusion event is present) according to the detection signal DET having the low voltage level, the die 140 is configured to store a timestamp value comprising the actual time provided by the RTC circuit 142 into the read-only register 144, i.e., the time of the chassis intrusion is recorded in the read-only register 144. Furthermore, the chassis intrusion event is also stored in the storage device 146. In the embodiment, the storage device 146 is configured to Simultaneously, the die 140 is configured to provide an alert signal ALRT through the corresponding pin 110 that is coupled to the resistor R2, so as to notify the host device 240 and the BMC 250. In some embodiments, the time and date of the RTC circuit 142 are not frozen during a chassis intrusion event.

The resistor R2 is a pull-up resistor and coupled between the power supply VCC and the pin 110 configured to provide the alert signal ALRT. When there has been a chassis intrusion event (i.e., the chassis intrusion event is present), the IC 100 is configured to provide the alert signal ALRT having a low voltage level to the host device 240 and the BMC 250. In response to the alert signal ALRT having a low voltage level, the host device 240 is configured to communicate with the IC 100, so as to check the event state stored in the storage device 146. After obtaining the timestamp value of the chassis intrusion event from the IC 100, the host device 240 is configured to store the timestamp value in the memory 245 as the last-event timestamp 247. Similarly, in response to the alert signal ALRT having a low voltage level, the BMC 250 is configured to communicate with the IC 100, so as to check the event state stored in the storage device 146. After obtaining the timestamp value of the chassis intrusion event from the IC 100, the BMC 250 is configured to store the timestamp value in the memory 255 as the last-event timestamp 257. Moreover, after obtaining the timestamp value of the chassis intrusion event, the host device 240 or the BMC 250 is configured to clear the event state in the storage device 146 of the die 140.

When the electronic apparatus 200 is powered-on, the host device 240 (or the BMC 250) is configured to read the timestamp value stored in the read-only register 144 and the last-event timestamp 247 stored in the memory 245 (or the last-event timestamp 257 stored in the memory 255), so as to compare the timestamp value and the last-event timestamp 247 (or the last-event timestamp 257). If the timestamp value is equal to the last-event timestamp 247 or 257, the host device 240 or the BMC 250 determines that the chassis intrusion event is absent, i.e., the chassis 210 has not been opened. If the timestamp value is different from the last-event timestamp 247 or 257, the host device 240 or the BMC 250 determines that there has been a chassis intrusion event, i.e., the chassis 210 has been opened, and obtains the intrusion time according to the timestamp value. Furthermore, the host device 240 or the BMC 250 further determines that the system time/date provided by the RTC circuit 142 may be untrustworthy, i.e., the system time and date have been tampered with.

When the host device 240 or the BMC 250 determines that the chassis 210 has been opened, the host device 240 or the BMC 250 is configured to launch the intrusion alarm/protection operations and re-program the system time and date into the IC 100. Furthermore, the host device 240 is configured to update the last-event timestamp 247 of the memory 245 according to the timestamp value stored in the read-only register 144. Similarly, the BMC 250 is configured to update the last-event timestamp 257 of the memory 255 according to the timestamp value stored in the read-only register 144. Moreover, the host device 240 or the BMC 250 is configured to clear the event state in the storage device 146 of the die 140.

By using the exposed pad 115 to detect the chassis intrusion event, the IC 100 does not require additional pin 110 to detect whether the chassis 210 is open. According to the detection signal DET from the exposed pad 115, the IC 100 is configured to detect whether there has been a chassis intrusion event. The chassis intrusion event indicates the chassis has been opened, for example, the chassis is currently opened or the chassis was once opened (i.e., the chassis is currently closed). When there has been a chassis intrusion event, the IC 100 is configured to store the timestamp value corresponding to the chassis intrusion event. When the electronic apparatus 200 is powered-on, the IC 100 is further configured to notify the host device 240 and the BMC 250 that there has been a chassis intrusion event. Thus, the host device 240 and the BMC 250 can immediately know that chassis intrusion event is present. As described above, when the electronic apparatus 200 is powered off, the IC 100 is powered by the voltage VBAT. Therefore, the IC 100 is capable of detecting the chassis intrusion event when the electronic apparatus 200 is powered off. If the chassis intrusion event occurred when the electronic apparatus 200 was powered-off, the host device 240 and the BMC 250 can compare the timestamp value of the IC 100 with the last-event timestamp 247 or 257 when the electronic apparatus 200 is powered-on, so as to determine whether the chassis 210 has been opened.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit (IC), comprising:
   a molding compound;
   a plurality of pins disposed on at least one edge of the molding compound and separated from each other;
   an exposed pad;
   a die surrounded by the molding compound;
   an adhesive material disposed between the die and the exposed pad and surrounded by the molding compound; and
   a plurality of bonding wires,
   wherein the exposed pad is electrically connected to the die through one of the bonding wires, and the pins are electrically connected to the die through the remaining bonding wires;
   wherein the die is configured to detect whether a chassis intrusion event is present in response to a signal from the exposed pad.

2. The IC as claimed in claim 1, wherein the exposed pad is electrically connected to a chassis open detection switch of an electronic apparatus.

3. The IC as claimed in claim 2, wherein the die comprises:
   a real time clock (RTC) circuit configured to provide time and date for the electronic apparatus; and
   a read-only register configured to store a timestamp value comprising actual time that the die detects that the chassis intrusion event is present.

4. The IC as claimed in claim 3, wherein the bonding wires are separated from each other by the molding compound.

5. The IC as claimed in claim 1, wherein the exposed pad is electrically coupled to a coin battery through a pull-up resistor.

6. The IC as claimed in claim 1, wherein the adhesive material is non-conductive epoxy.

7. The IC as claimed in claim 1, wherein the exposed pad is electrically separated from the die by the adhesive material.

8. An electronic apparatus, comprising:
   a chassis;
   a chassis open detection switch disposed to contact the chassis;
   a host device; and
   an integrated circuit (IC), and comprising:
      a molding compound;
      a plurality of pins disposed on at least one edge of the molding compound and separated from each other, wherein a first group of the pins is coupled to the host device through a first bus;
an exposed pad electrically connected to the chassis open detection switch to receive a detection signal of the chassis open detection switch;
a die surrounded by the molding compound;
an adhesive material disposed between the die and the exposed pad; and
a plurality of bonding wires,
wherein the exposed pad is electrically connected to the die through one of the bonding wires, and the pins are electrically connected to the die through the remaining bonding wires;
wherein the IC is configured to detect whether the chassis has been opened in response to the detection signal from the exposed pad.

9. The electronic apparatus as claimed in claim 8, wherein the die comprises:
a real time clock (RTC) circuit configured to provide time and date for the electronic apparatus; and
a read-only register configured to store a timestamp value comprising actual time that the IC detects that the chassis has been opened.

10. The electronic apparatus as claimed in claim 9, wherein the IC is configured to provide the timestamp value to the host device through the first group of the pins.

11. The electronic apparatus as claimed in claim 10, further comprising:
a first non-volatile memory coupled to the host device,
wherein the host device is configured to store the timestamp value to the first non-volatile memory as a last-event timestamp,
wherein the host device is configured to determine whether the last-event timestamp is equal to the timestamp value stored in the read-only register when the electronic apparatus is powered on.

12. The electronic apparatus as claimed in claim 11, wherein when the last-event timestamp is not equal to the timestamp value stored in the read-only register, the host device is configured to determine that the chassis has been opened.

13. The electronic apparatus as claimed in claim 11, wherein when the last-event timestamp is equal to the timestamp value stored in the read-only register, the host device is configured to determine that the chassis has not been opened.

14. The electronic apparatus as claimed in claim 9, further comprising:
a baseboard management controller (BMC) coupled to a second group of pins of the IC through a second bus,
wherein the IC is configured to provide the timestamp value to the BMC through the second group of the pins.

15. The electronic apparatus as claimed in claim 14, further comprising:
a second non-volatile memory coupled to the BMC,
wherein the BMC is configured to store the timestamp value to the second non-volatile memory as a last-event timestamp,
wherein the BMC is configured to determine whether the last-event timestamp is equal to the timestamp value stored in the read-only register when the electronic apparatus is powered on.

16. The electronic apparatus as claimed in claim 8, further comprising:
a coin battery; and
a pull-up resistor coupled between the coin battery and the exposed pad of the IC.

17. The electronic apparatus as claimed in claim 16, wherein when the chassis is opened, the chassis open detection switch is turned on, and the pull-up resistor is coupled to a ground through the turned-on chassis open detection switch.

18. The electronic apparatus as claimed in claim 8, wherein the adhesive material is non-conductive epoxy.

19. The electronic apparatus as claimed in claim 8, wherein the exposed pad is electrically separated from the die by the adhesive material.

20. The electronic apparatus as claimed in claim 8, wherein at least one of the first bus and the second bus is an inter-integrated circuit (I2C) bus.

\* \* \* \* \*